United States Patent
Zaribafiyan et al.

(10) Patent No.: US 9,916,283 B2
(45) Date of Patent: Mar. 13, 2018

(54) METHOD AND SYSTEM FOR SOLVING A PROBLEM INVOLVING A HYPERGRAPH PARTITIONING

(71) Applicant: 1QB INFORMATION TECHNOLOGIES INC., Vancouver, British Columbia (CA)

(72) Inventors: Arman Zaribafiyan, Vancouver (CA); Dominic Marchand, Vancouver (CA)

(73) Assignee: 1QG INFORMATION TECHNOLOGIES INC., Vancouver, British Columbia (CA)

( * ) Notice: Subject to any disclaimer, the term of this patent is extended or adjusted under 35 U.S.C. 154(b) by 124 days.

(21) Appl. No.: 14/978,909

(22) Filed: Dec. 22, 2015

(65) Prior Publication Data
US 2017/0177544 A1    Jun. 22, 2017

(51) Int. Cl.
G06F 17/10    (2006.01)
G06F 17/11    (2006.01)
G06N 99/00    (2010.01)
G06N 5/00    (2006.01)

(52) U.S. Cl.
CPC ............ G06F 17/11 (2013.01); G06N 5/003 (2013.01); G06N 99/002 (2013.01)

(58) Field of Classification Search
None
See application file for complete search history.

(56) References Cited

U.S. PATENT DOCUMENTS

| | | | |
|---|---|---|---|
| 6,532,578 B2 * | 3/2003 | Chakraborty | G06F 17/5072 716/124 |
| 7,296,252 B2 * | 11/2007 | Alpert | G06F 17/50 716/122 |
| 9,009,147 B2 * | 4/2015 | He | G06F 17/30958 707/728 |

(Continued)

OTHER PUBLICATIONS

Farhi, Edward, et al., "Quantum Adiabatic Evolution Algorithms versus Simulated Annealing," Massachusetts Institute of Technology, Cambridge, MA, Jan. 2002.

(Continued)

Primary Examiner — Michael D. Yaary
(74) Attorney, Agent, or Firm — Hauptman Ham, LLP

(57) ABSTRACT

A method for solving a problem involving a hypergraph partitioning is disclosed, the method comprising receiving an indication of a problem involving a hypergraph partitioning; obtaining at least one property associated with a quadratic unconstrained binary optimization solver operatively coupled with the digital computer; formulating a partitioning problem of the hypergraph as an unconstrained binary optimization problem; reducing the unconstrained binary optimization problem into a quadratic unconstrained binary optimization problem; mapping the quadratic unconstrained binary optimization problem into the quadratic unconstrained binary optimization solver; obtaining from the quadratic unconstrained binary optimization solver at least one solution to the quadratic unconstrained binary optimization problem; applying a refinement procedure and translating the refined at least one solution to provide an indication of the partitioning and providing a solution to the problem.

17 Claims, 10 Drawing Sheets

(56) References Cited

U.S. PATENT DOCUMENTS

2011/0098990 A1* 4/2011 Fang ................ G06F 17/5036
703/2

OTHER PUBLICATIONS

Gicquel, Laurent Y.M., et al., "High performance parallel computing of flows in complex geometries," Comptes Rendus Mecanique, www.sciencedirect.com, Jan. 2011, Toulouse cedex, France.

Johnson, M. W., et al., "Quantum annealing with manufactured spins," Nature, vol. 473, May 2011, Burnaby, British Columbia, Canada.

McGeoch, Catherine C., et al., "Experimental Evaluation of an Adiabatic Quantum System for Combinatorial Optimization," May 12013, Ischia, Italy.

Cai, Jun, et al., "A practical heuristic for finding graph minors," Jun. 2014, D-Wave Systems Inc.

Safro, Ilya, et al., "Advanced Coarsening Schemes for Graph Partitioning," ACM J. Exp. Algor. 19, 2, Article 2.2 (Dec. 2014), <http://dx.doi.org/10.1145/2670338>.

* cited by examiner

METHOD AND SYSTEM FOR SOLVING A PROBLEM INVOLVING A HYPERGRAPH PARTITIONING

FIELD

This invention relates to data processing. More precisely, this invention pertains to a method and system for solving a problem involving a hypergraph partitioning.

BACKGROUND

Many technical problems involve hypergraph partitioning.

In fact, graphs and hypergraphs are mathematical objects that are useful for representing data obtained in various scientific or industrial applications.

More precisely, graphs and hypergraphs describe a collection of nodes, or vertices, connected together through edges. The data relevant to the specific problem can be attached to vertices, and/or edges which are referred to as the vertex and edge metadata. It will be appreciated that part of the problem-specific information may be also stored in the structure of the hypergraph itself by specifying the vertices and the edges between them.

It will be appreciated that a graph is defined as an ordered pair G=(V, E) comprising a set V of vertices and a set E of edges which are 2-subsets of V.

A hypergraph is defined as an ordered pair G=(V, E) comprising a set V of vertices and a set E of edges which are subsets of V.

The weight of an edge may be defined to be equal to a function of a plurality of edge and vertex properties. In one embodiment, the weight does not depend on other properties and a unit weight is simply assigned to all edges of the input hypergraph.

The vertex weight can be defined to be another vertex property of the hypergraph or a function of a plurality of the vertex and edge properties. In one embodiment, the vertex property is a unit weight.

It will be appreciated that the goal of performing a graph partitioning is to divide the vertex set V of a graph G into a given number of disjoint parts of approximately the same weight so that a metric on the number and weight of inter-partition edges is minimized.

It will be further appreciated that the size of a hypergraph or a partition is defined as the number of vertices in the hypergraph or partition. It will be appreciated that the weight of a hypergraph or partition can be defined as the sum of the vertex weights in the hypergraph or partition. In one embodiment where the vertex weight is initialized to be a unit weight, the two definitions coincide.

When partitioning a hypergraph, edges are cut by the lines dividing the partitions. It will be appreciated that the edge of a hypergraph is not cut if all vertices attached to it are in one partition, and cut exactly once otherwise, no matter how many vertices are assigned to each partition.

Various generalizations of graph partitioning exist, having been adapted for specific technical problems by imposing additional constraints on the individual partitions.

The skilled addressee will appreciate that graph partitioning falls under the category of NP-hard problems. Solutions are generally derived using heuristic or approximation algorithms. Furthermore, even approximating the balanced graph partitioning can be shown to be NP-complete.

It will be appreciated that the solving of a problem involving a hypergraph partitioning is therefore cumbersome since it requires large amount of resources.

Another issue is that most interesting applications involving hypergraph partitioning involve very large graphs for which exact methods are prohibitively slow.

Another issue with the solving of a problem involving a hypergraph is that faster methods come at the cost of sacrificing the quality of the solution by introducing multiple approximations.

There is a need for a method and system that will overcome at least one of the above-identified drawbacks.

Features of the invention will be apparent from review of the disclosure, drawings and description of the invention below.

BRIEF SUMMARY

According to a broad aspect, there is disclosed a method for solving a problem involving a hypergraph partitioning, the method comprising receiving in a digital computer an indication of a problem involving a hypergraph partitioning, the indication comprising an indication of a hypergraph and metadata; obtaining in the digital computer an indication of at least one property associated with a quadratic unconstrained binary optimization solver operatively coupled with the digital computer; using the digital computer, formulating a partitioning problem of the hypergraph as a quadratic unconstrained binary optimization problem; mapping the quadratic unconstrained binary optimization problem into the quadratic unconstrained binary optimization solver; obtaining in the digital computer from the quadratic unconstrained binary optimization solver at least one solution to the quadratic unconstrained binary optimization problem; using the digital computer, translating the at least one solution to provide an indication of the partitioning and providing the indication of the partitioning using the digital computer.

In accordance with an embodiment, the method further comprises performing a pre-processing of the hypergraph using the digital computer to provide a new hypergraph having a suitable size for the quadratic unconstrained binary optimization solver; wherein the formulating of the partitioning problem as a quadratic unconstrained binary optimization problem is performed using the new hypergraph and the method further comprises performing a post-processing of the at least one solution using the digital computer to provide post-processed at least one solution and the translating to provide an indication of the partitioning is performed using the post-processed at least one solution.

In accordance with an embodiment, the pre-processing of the hypergraph to provide a new hypergraph having a suitable size for the quadratic unconstrained binary optimization solver comprises performing a coarsening of the hypergraph and the post-processing of the at least one solution comprises performing an un-coarsening of the at least one solution.

In accordance with an embodiment, the indication of a problem involving a hypergraph partitioning is received from at least one of a user interacting with the digital computer, a computer operatively connected to the digital computer, a software package and an intelligent agent.

In accordance with an embodiment, the indication of at least one property associated with a quadratic unconstrained binary optimization solver operatively coupled with the digital computer is obtained from at least one of a user interacting with the digital computer, a computer operatively connected to the digital computer, a software package, the quadratic unconstrained binary optimization solver and an intelligent agent.

In accordance with an embodiment, the coarsening of the hypergraph comprises determining a coarsening objective and performing a coarsening of the hypergraph.

In accordance with an embodiment, the method further comprises determining if at least one further coarsening can be performed; determining if the coarsening objective is met and performing at last one further coarsening if the coarsening objective is not met and if the at least one further coarsening can be performed.

In accordance with an embodiment, the formulating of a partitioning problem of the new hypergraph as a quadratic unconstrained binary optimization problem comprises formulating a plurality of partitioning problems, each of the plurality of partitioning problems as a corresponding quadratic unconstrained binary optimization problem; further wherein each of the plurality of corresponding quadratic unconstrained binary optimization problems is mapped into the quadratic unconstrained binary optimization solver and further wherein a plurality of at least one solution is obtained in the digital computer from the quadratic unconstrained binary optimization solver for each of the corresponding plurality of partitioning problems.

In accordance with an embodiment, the formulating of a partitioning problem of the new hypergraph as a quadratic unconstrained binary optimization problem comprises determining if the new hypergraph is a graph and if the new hypergraph is not a graph formulating, using the digital computer, the partitioning problem of the new hypergraph as an unconstrained binary optimization problem; and reducing the unconstrained binary optimization problem into a quadratic unconstrained binary optimization problem.

In accordance with an embodiment, the un-coarsening of the at least one solution comprises, until un-coarsening is completed, performing an un-coarsening of the at least one solution and applying a refinement procedure on the least one un-coarsened solution.

In accordance with an embodiment, the refinement procedure on the at least one un-coarsened solution comprises formulating refinement as at least one optimization problem; converting constraints to penalty terms and generating a corresponding quadratic unconstrained binary optimization problem using the at least one optimization problem; embedding the corresponding quadratic unconstrained binary optimization problem into the quadratic unconstrained binary optimization solver; and obtaining from the quadratic unconstrained binary optimization solver a solution to the corresponding quadratic unconstrained binary optimization problem.

In accordance with a broad aspect, there is disclosed a method for solving a problem involving a hypergraph partitioning, the method comprising receiving an indication of a problem involving a hypergraph partitioning, the indication comprising an indication of a hypergraph and metadata; obtaining an indication of at least one property associated with a quadratic unconstrained binary optimization solver operatively coupled with the digital computer; formulating a partitioning problem of the hypergraph as an unconstrained binary optimization problem; reducing the unconstrained binary optimization problem into a quadratic unconstrained binary optimization problem; mapping the quadratic unconstrained binary optimization problem into the quadratic unconstrained binary optimization solver; obtaining from the quadratic unconstrained binary optimization solver at least one solution to the quadratic unconstrained binary optimization problem; applying a refinement procedure and translating the refined at least one solution to provide an indication of the partitioning and providing the indication of the partitioning.

In accordance with an embodiment, the method further comprises performing a coarsening of the hypergraph to provide a new hypergraph having a suitable size for the quadratic unconstrained binary optimization solver; wherein the formulating of the partitioning problem as an unconstrained binary optimization problem is performed using the new hypergraph and the method further comprises performing an un-coarsening of the at least one solution; wherein the applying of the refinement procedure is performed on the un-coarsened at least one solution and the translating to provide an indication of the partitioning is performed on the refined un-coarsened at least one solution.

In accordance with an embodiment, the indication of the partitioning is provided to at least one of a user interacting with the digital computer, a computer operatively connected to the digital computer, a software package and an intelligent agent.

In accordance with another broad aspect, there is disclosed a system for solving a problem involving a hypergraph partitioning, the system comprising a digital computer for receiving an indication of a problem involving a hypergraph partitioning, the indication comprising an indication of a hypergraph and metadata; the digital computer for performing a coarsening of the hypergraph to provide a new hypergraph having a suitable size for the quadratic unconstrained binary optimization solver; the digital computer for formulating a partitioning problem of the new hypergraph as an unconstrained binary optimization problem and for reducing the unconstrained binary optimization problem into a quadratic unconstrained binary optimization problem; the digital computer for providing the quadratic unconstrained binary optimization problem and a quadratic unconstrained binary optimization solver operatively coupled to the digital computer, the quadratic unconstrained binary optimization solver for receiving the quadratic unconstrained binary optimization problem from the digital computer and for determining at least one solution to the quadratic unconstrained binary optimization problem and wherein the digital computer further performs an un-coarsening of the at least one solution, applies a refinement procedure and translates the refined un-coarsened at least one solution to provide an indication of the partitioning to thereby provide an indication of the partitioning.

According to another broad aspect, there is disclosed a digital computer comprising a central processing unit; a display device; a communication port for operatively connecting the digital computer to a quadratic unconstrained binary optimization solver; a memory unit comprising an application for solving a problem involving a hypergraph partitioning, the application comprising instructions for receiving an indication of a problem involving a hypergraph partitioning, the indication comprising an indication of a hypergraph and metadata; instructions for obtaining an indication of at least one property associated with the quadratic unconstrained binary optimization solver operatively coupled with the digital computer; instructions for formulating a partitioning problem of the hypergraph as an unconstrained binary optimization problem; instructions for reducing the unconstrained binary optimization problem into a quadratic unconstrained binary optimization problem; instructions for mapping the quadratic unconstrained binary optimization problem into the quadratic unconstrained binary optimization solver; instructions for obtaining from the quadratic unconstrained binary optimization solver at least one solution to the quadratic unconstrained binary optimization problem; instructions for applying a refinement procedure and translating the refined at least one solution to provide an indication of the partitioning and instructions for providing the indication of the partitioning.

According to another broad aspect, there is disclosed a non-transitory computer-readable storage medium for storing computer-executable instructions which, when executed, cause a digital computer to perform a method for method for solving a problem involving a hypergraph partitioning, the method comprising receiving an indication of a problem involving a hypergraph partitioning, the indication comprising an indication of a hypergraph and metadata; obtaining an indication of at least one property associated with a quadratic unconstrained binary optimization solver operatively coupled with the digital computer; formulating a partitioning problem of the hypergraph as an unconstrained binary optimization problem; reducing the unconstrained binary optimization problem into a quadratic unconstrained binary optimization problem; mapping the quadratic unconstrained binary optimization problem into the quadratic unconstrained binary optimization solver; obtaining from the quadratic unconstrained binary optimization solver at least one solution to the quadratic unconstrained binary optimization problem; applying a refinement procedure and translating the refined at least one solution to provide an indication of the partitioning and providing the indication of the partitioning.

An advantage of the method disclosed is that it greatly improves the solving of a problem involving a hypergraph partitioning.

An advantage of the method disclosed is that the target quadratic unconstrained binary optimization solver is assumed to scale better with problem size thus leading to shorter runtimes.

The partitioning of a single sub-problem on the quadratic unconstrained binary optimization solver is also assumed to be optimal or close to optimal, thus promising enhanced quality for the full partitioning problem.

It will be appreciated that a better scaling of the quadratic unconstrained binary optimization solver with problem size imply less pre-processing and potential fewer partitioning steps, therefore fewer approximations and better quality solution.

BRIEF DESCRIPTION OF THE DRAWINGS

In order that the invention may be readily understood, embodiments of the invention are illustrated by way of example in the accompanying drawings.

FIG. 9 also shows how the variables and lists described in the methodology vary throughout the iterative process.

Figure 1:
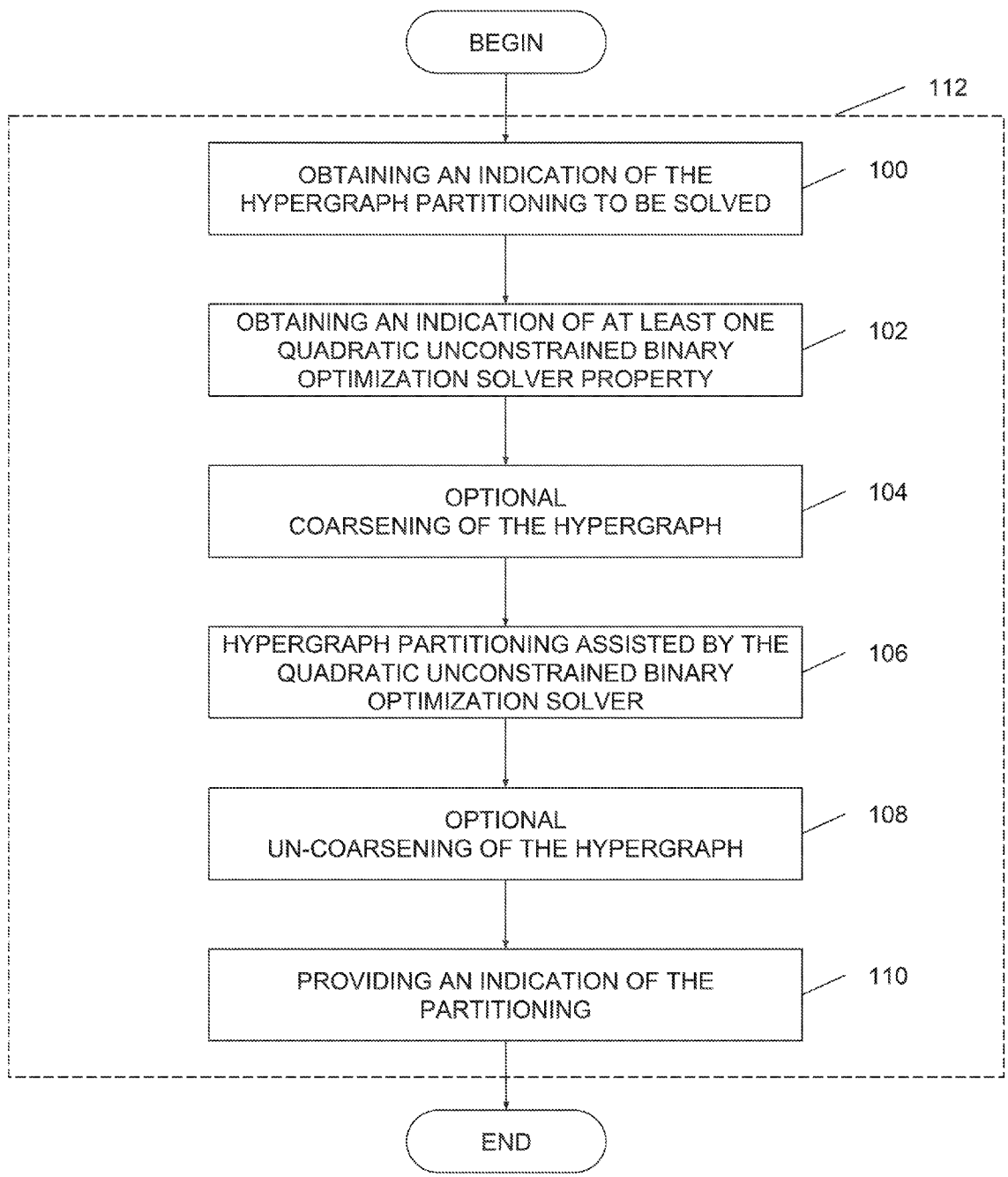
FIG. 1 is a flowchart which shows an embodiment of a method for solving a problem involving a hypergraph partitioning solver.

Further details of the invention and its advantages will be apparent from the detailed description included below.

DETAILED DESCRIPTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain. For example, in a sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "i.e." and like terms mean "that is," and thus limit the terms or phrases they explain.

The term "quantum annealer" and like terms mean a system consisting of one or many types of hardware that can find optimal or sub-optimal solutions to an unconstrained binary quadratic programming problem. An example of this is a system consisting of a digital computer embedding a binary quadratic programming problem as an Ising spin model, attached to an analog computer that carries optimization of a configuration of spins in an Ising spin model using quantum annealing as described, for example, in Farhi, E. et al., "Quantum Adiabatic Evolution Algorithms versus Simulated Annealing" arXiv.org:quant-ph/0201031 (2002), pp 1-16. An embodiment of such analog computer is disclosed by McGeoch, Catherine C. and Cong Wang, (2013), "Experimental Evaluation of an Adiabiatic Quantum System for Combinatorial Optimization," Computing Frontiers, May 14-16, 2013 (http://www.cs.amherst.edu/ccm/cf14-mcgeoch.pdf) and also disclosed in U.S. Patent Application Publication No. US2006/0225165. It will be appreciated that the "quantum annealer" may also be comprised of "classical components," such as a classical computer. Accordingly, a "quantum annealer" may be entirely analog or an analog-classical hybrid.

The term "embedding" of a binary optimization problem, and the like, refer to an assignment of a set of the quantum bits $\{q_{i1}, q_{i2}, \ldots, q_{it_i}\}$ to each binary variable $x_i$. Specifications of the role of such an embedding in solving an unconstrained binary quadratic programming problem and presentation of an efficient algorithm for it are disclosed for instance in "*A practical heuristic for finding graph minors*"—Jun Cai, William G. Macready, Aidan Roy, in U.S. Patent Application Publication No. US2008/0218519 and in U.S. Pat. No. 8,655,828 B2.

It will be appreciated that according to its common definition a graph is a hypergraph where edges in the set of edges E are 2-element subsets of the vertex set V. It will be further appreciated that a graph is a specific embodiment of a hypergraph. Therefore, the methods disclosed herein for hypergraphs are also applicable to graphs. Consequently, the terms graph and hypergraph are used interchangeably in the following except where a clear distinction is made obvious.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

With all this in mind, the present application is directed to a method, a system and a computer-readable media for solving a problem involving a hypergraph partitioning.

Now referring to FIG. 1, there is shown an embodiment of a method for solving a problem involving a hypergraph partitioning.

According to processing step 100, an indication of a problem involving a hypergraph partitioning to be solved is obtained.

In one embodiment, the indication of a problem involving a hypergraph partitioning to be solved is obtained in a digital computer. It will be appreciated that the digital computer is operatively connected to a quadratic unconstrained binary optimization solver. The connection may be of various types and is known to the skilled addressee.

In one embodiment, the indication comprises a hypergraph, the vertex weights, the edge weights and the number of partitions desired (K).

It will be appreciated that the indication of the problem involving a hypergraph partitioning may be obtained according to various embodiments.

According to an embodiment, the indication of the problem involving a hypergraph partitioning is obtained from a user interacting with the digital computer.

In an alternative embodiment, the indication of the problem involving a hypergraph partitioning is obtained from another computer operatively connected to the digital computer.

In another alternative embodiment, the indication of the problem involving a hypergraph partitioning is obtained from a software package.

In a further alternative embodiment, the indication of the problem involving a hypergraph partitioning is obtained from an intelligent agent.

According to processing step 102, an indication of at least one quadratic unconstrained binary optimization solver property is obtained.

In one embodiment, the indication of at least one quadratic unconstrained binary optimization solver property is obtained in the digital computer.

In one embodiment, the quadratic unconstrained binary optimization solver is a quantum annealer such as the ones manufactured by D-Wave Systems (see M. W. Johnson, M. H. S. Amin, S. Gildert, T. Lanting, F. Hamze, N. Dickson, R. Harris, A. J. Berkley, J. Johansson, P. Bunyk, E. M. Chapple, C. Enderud, J. P. Hilton, K. Karimi, E. Ladizinsky, N. Ladizinsky, T. Oh, I. Perminov, C. Rich, M. C. Thom, E. Tolkacheva, C. J. S. Truncik, S. Uchaikin, J. Wang, B. Wilson, Quantum annealing with manufactured spins, Nature 473, 12 May 2011, pages 194-198 http://doi:10.1038/ nature10012 for more information on the quantum annealer). The skilled addressee will appreciate that alternatively other quantum computers may be used at some point. It will be appreciated that the at least one quadratic unconstrained binary optimization solver property may comprise for instance a number of registers and a corresponding connectivity. In fact, it will be appreciated that the connectivity of the registers dictates the size in number of variables of the problems that can be solved and, therefore, the size of the hypergraph that can be partitioned using it.

Moreover, it will be appreciated that the indication of the at least one quadratic unconstrained binary optimization solver property may be obtained according to various embodiments.

According to an embodiment, the indication of the at least one quadratic unconstrained binary optimization solver property is obtained from a user interacting with the digital computer.

In an alternative embodiment, the indication of the at least one quadratic unconstrained binary optimization solver property is obtained from another computer operatively connected to the digital computer.

In another alternative embodiment, the indication of the at least one quadratic unconstrained binary optimization solver property is obtained from a software package.

In a further alternative embodiment, the indication of the at least one quadratic unconstrained binary optimization solver property is obtained from an intelligent agent.

In a further alternative embodiment, the indication of at least one quadratic unconstrained binary optimization solver property is obtained from the quadratic unconstrained binary optimization solver itself.

It will be appreciated that in one embodiment the partitioning process may rely on optional pre-processing and post-processing steps. It will be appreciated that the optional pre-processing and post-processing steps may be instrumental when solving large-scale graph partitioning problems.

In one embodiment, the optional pre-processing and the post-processing steps comprise coarsening and un-coarsening steps.

It will be appreciated that the coarsening of a graph is a process where vertices are grouped together to create larger effective vertices. An effective vertex's weight is defined to be the sum of the weights of the vertices within. Similarly, the coarsening can lead to multiple edges being grouped together as an effective edge between the resulting effective vertices. Here, too, the weight of the effective edge is the sum of the weights of the edges grouped together. It will be therefore appreciated that the coarsening processing step therefore decreases the size of the hypergraph, but it does not increase the total vertex weight.

The reverse processing step consists of expanding the effective nodes and edges. It will be appreciated by the skilled addressee that the coarsening processing step needs to retain the appropriate information to recover the original hypergraph for this reverse processing step to be possible.

According to processing step 104, the hypergraph is coarsened iteratively to obtain a coarser graph with fewer vertices. It will be appreciated that this processing step is optional.

In one embodiment, the hypergraph is coarsened iteratively using a digital computer.

It will be appreciated that the optional coarsening processing step involves applying a procedure to group sets of vertices together in order to create new effective nodes.

Figure 2:
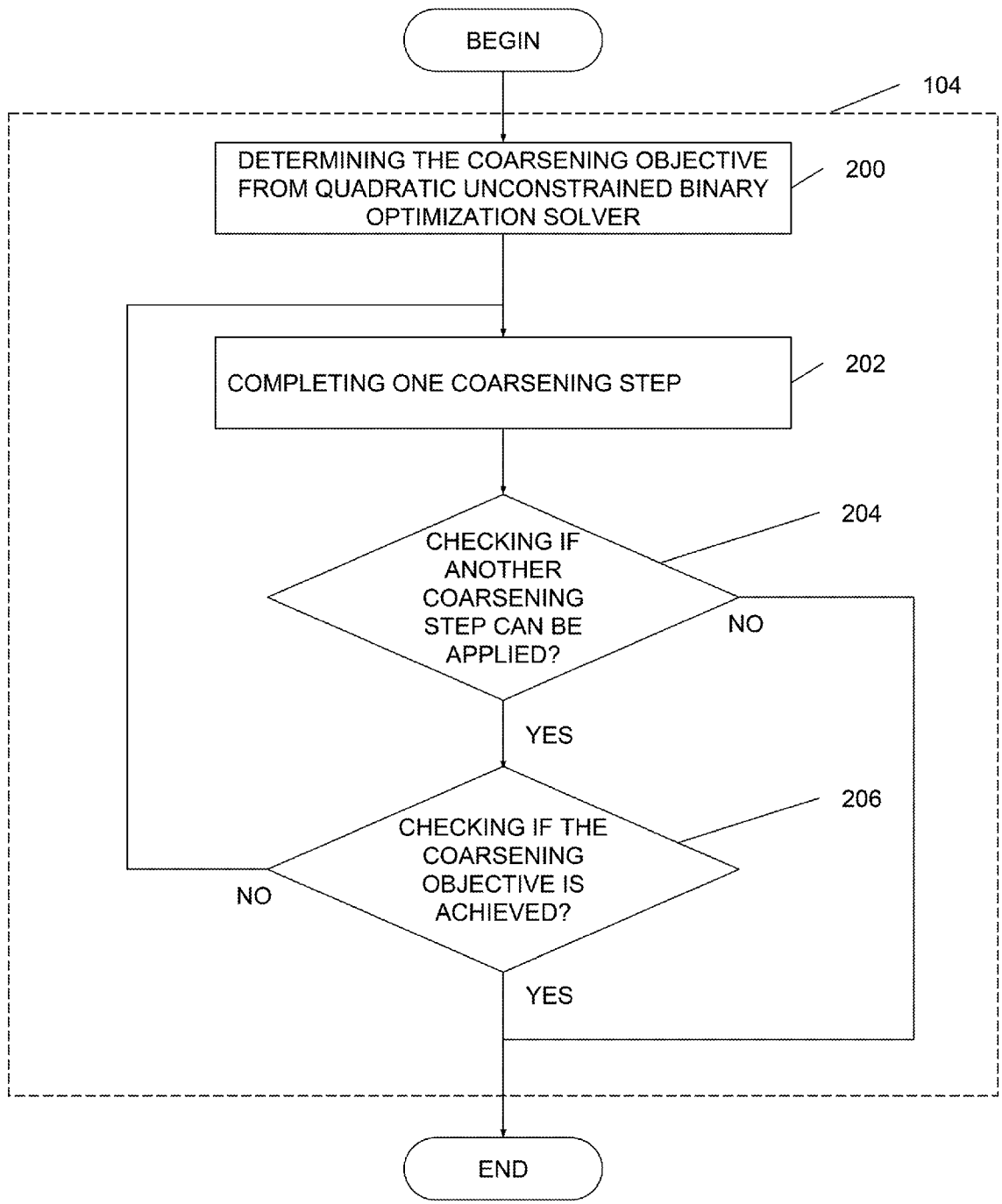
FIG. 2 is a flowchart which shows an embodiment of a method for coarsening a hypergraph iteratively.

Now referring to FIG. 2, there is shown an embodiment of the optional coarsening processing step.

According to processing step 200, a coarsening objective is determined from the at least one quadratic binary optimization solver property.

In one embodiment, the coarsening objective is to obtain a coarse hypergraph whose K-way action partitioning can be solved directly or iteratively on the quadratic unconstrained binary optimization solver through a feasible sequence of partitioning. Whether a partitioning can be solved on the quadratic unconstrained binary optimization solver may be easily determined by a skilled addressee.

In one embodiment, the hypergraph comprises a graph, and the size of the quadratic unconstrained binary optimization problem (QUBO) to be solved in number of variables for a bisection is the size of the graph.

Still referring to FIG. 2 and according to processing step 202, a coarsening step is performed.

It will be appreciated by the skilled addressee that various coarsening algorithms may be used for performing the coarsening processing step. In fact, many of the proposed algorithms fall either under contraction-based schemes or algebraic multigrid schemes (see I. Safro, P. Sanders, C. Schulz, Advanced Coarsening Schemes for Graph Partitioning, Journal Experimental Algorithmics 19, January 2015, DOI=http://dx.doi.org/10.1145/2670338). It will be appreciated that a skilled addressee is familiar with these approaches.

In fact, it will be appreciated that the choice of a coarsening algorithm may be affected by the input hypergraph and the at least one property of the quadratic unconstrained binary optimization solver. It will be also appreciated that some coarsening algorithms are not iterative and would be completed in one single step.

The result of the coarsening step is a coarser hypergraph where the weight of each effective vertex is the sum of the weights of the vertices it contains. The weight of effective edges is the sum of the weights of the edges it represents.

It will be further appreciated that the coarsening processing step is non-destructive and fully referenced in the sense that the previous hypergraph is preserved and a new coarser hypergraph is created with references to the previous one. It will be appreciated that, at each point of the method described herein, a vertex or an effective vertex can be cast as a set of vertices of the original hypergraph by following these references between hypergraphs. In one embodiment this is done by keeping a list of references to the vertices and edges and their metadata of the previous hypergraph.

Still referring to FIG. 2 and according to processing step 204, a test is performed in order to find out if at least one further coarsening step can be applied.

In an embodiment, the coarsening algorithm is not iterative and there are no further coarsening steps taken.

In another embodiment, the coarsening algorithm is iterative, but the maximum acceptable or achievable coarsening is limited. In such embodiment, a decrease in the number of effective vertices can be measured and stopped if this decrease is smaller than a variable minimum value determined by the type of algorithm. The decision may be based on studies and comparison of coarsening algorithms such as, for instance, the one described by I. Safro, P. Sanders and C. Schulz in "Advanced Coarsening Schemes for Graph Partitioning," Journal Experimental Algorithm ics 19, January 2015, DOI=http://dx.doi.org/10.1145/2670338.

This processing step assesses if the maximum achievable coarsening has been reached.

According to processing step 206, a test is performed in order to find out if the coarsening objective has been achieved.

In one embodiment, the test comprises comparing the size of the coarse hypergraph to the coarsening objective determined in step 200.

Now referring back to FIG. 1 and according to processing step 106, the coarse hypergraph is partitioned. In the case where the optional processing step 104 is not performed, the hypergraph is partitioned.

In one embodiment, the K-way partitioning of the coarse hypergraph is performed using at least the quadratic unconstrained binary optimization solver.

In fact, and as further detailed below, it will be appreciated that the K-way partitioning of the coarse hypergraph comprises formulating a partitioning problem of the coarse hypergraph as a quadratic unconstrained binary optimization problem, mapping the quadratic unconstrained binary optimization problem into the quadratic unconstrained binary optimization solver and obtaining from the quadratic unconstrained binary optimization solver at least one solution to the quadratic unconstrained binary optimization problem.

In one embodiment, the formulating of a partitioning problem of the coarse hypergraph as a quadratic unconstrained binary optimization problem is performed using the digital computer.

In one embodiment, the at least one solution to the quadratic unconstrained binary optimization problem is obtained by the digital computer from the quadratic unconstrained binary optimization solver.

Figure 3:
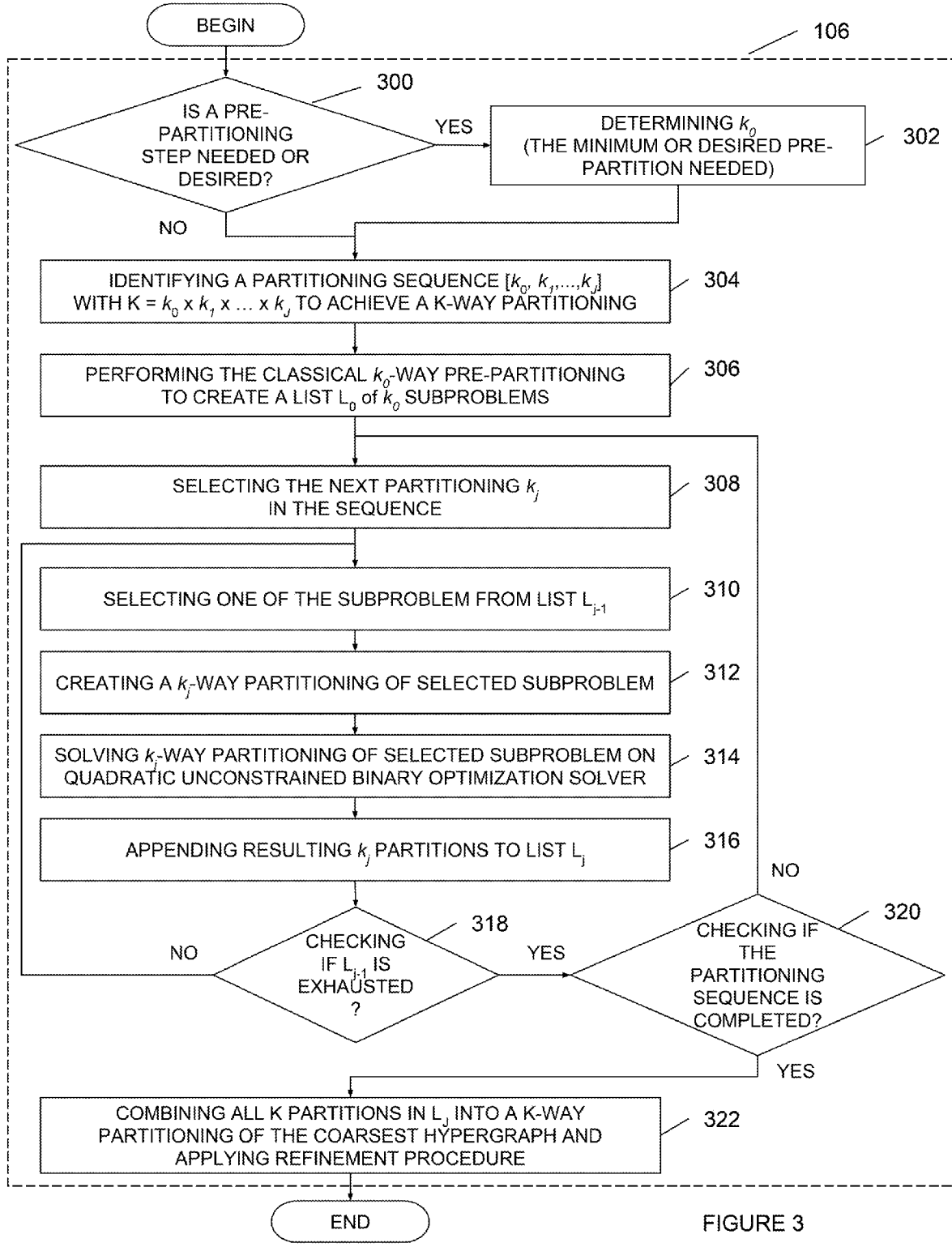
FIG. 3 is a flowchart which shows an embodiment of a hybrid method for partitioning a hypergraph using a quadratic unconstrained binary optimization solver with an optional pre-partitioning step.

Now referring to FIG. 3, there is shown an embodiment for performing the K-way partitioning of the coarse hypergraph.

In the simplest case, the coarse hypergraph K-way partitioning may be performed directly on the quadratic unconstrained binary optimization solver as a single problem.

It will be appreciated that for larger hypergraphs, the original problem can be decomposed in a sequence of partitioning problems that are small enough to be solved on the quadratic unconstrained binary optimization solver. Furthermore, the procedure allows for an initial classical pre-partitioning to address even larger coarser graphs.

According to processing step 300, a test is performed to find out if a pre-partitioning step is needed or desired.

In one embodiment, this is done by checking if the quadratic unconstrained binary optimization solver is able to at least bisect (2-way partitioning) the coarse hypergraph.

In one embodiment, even if the quadratic unconstrained binary optimization solver is indeed able to solve this problem, the user can still elect to have part of the partitioning done using a pre-partitioning method.

A hybrid partitioning method is described where a sequence of partitioning steps are determined in order to efficiently achieve a K-way partitioning where the first step is considered a pre-partitioning done by a different method that may not involve the target quadratic unconstrained binary optimization solver while the other steps are done on the quadratic unconstrained binary optimization solver.

In one embodiment, the pre-partitioning is performed using a classical algorithm running on a digital computer while the quadratic unconstrained binary optimization solver is a quantum annealer, thus describing a digital/quantum hybrid solver where the quantum annealer assists the digital solver by providing an improved solution to part of the original problem.

Still referring to FIG. 3 and according to processing step 302, the minimum partition needed or desired in the pre-partitioning step is determined.

This consists in identifying the value of $k_0 < K$ for the initial $k_0$-way pre-partitioning in the overall K-way partitioning sequence where $K = k_0 \times k_1 \times \ldots \times k_J$.

According to processing step 304, the rest of the partitioning sequence $[k_1, \ldots, k_J]$ is determined.

It will be appreciated that using a sequence of partitioning steps always involves some approximation; therefore, the most desirable sequence is a single partitioning step that could be executed on the quadratic unconstrained binary optimization solver. When this is not an option, the sequence is optimized such that as few steps as possible are needed in order to stay as close as possible to optimality.

It will be appreciated that various algorithms may be applied to solve this optimization problem.

In one embodiment, a greedy algorithm is applied to factor $K/k_0$ into the smallest number of factors where each corresponds to a partitioning problem that may run on the quadratic unconstrained binary optimization solver.

According to processing step 306, a $k_0$-way pre-partitioning of the coarse hypergraph is performed with a chosen pre-partitioning method.

A list of the sub-hypergraphs corresponding to the partitions created is produced.

It will be appreciated that various known partitioning methods may be used depending on the size and details of the problem.

This method is usually a classical algorithm which admits larger hypergraphs, but is assumed to be less desirable, due to accuracy and/or speed, than the partitioning on the target quadratic unconstrained binary optimization solver.

Now referring to processing steps 308-320, each of the $k_0$ subproblems in list $L_0$ produced by the $k_0$-way pre-partitioning is partitioned by a sequence of partitioning steps defined by $[k_1, \ldots, k_J]$. Each partitioning step is a $k_j$-way partitioning of the sub-hypergraphs stored in list $L_{j-1}$. At the end of processing step 320, the list $L_J$ contains K partitions or K sub-hypergraphs.

According to processing step 314, the quadratic unconstrained binary optimization solver is used to solve the $k_j$-way partitioning subproblems. Further details of how this procedure is achieved are described further herein below.

According to processing step 322, an indication of a K-way partitioning for the coarsest graph is generated. A refinement procedure allowing for small adjustments between partitions may be applied. It will be appreciated that this procedure is similar to the refinement applied in processing step 502 during the un-coarsening process and described later.

Figure 4:
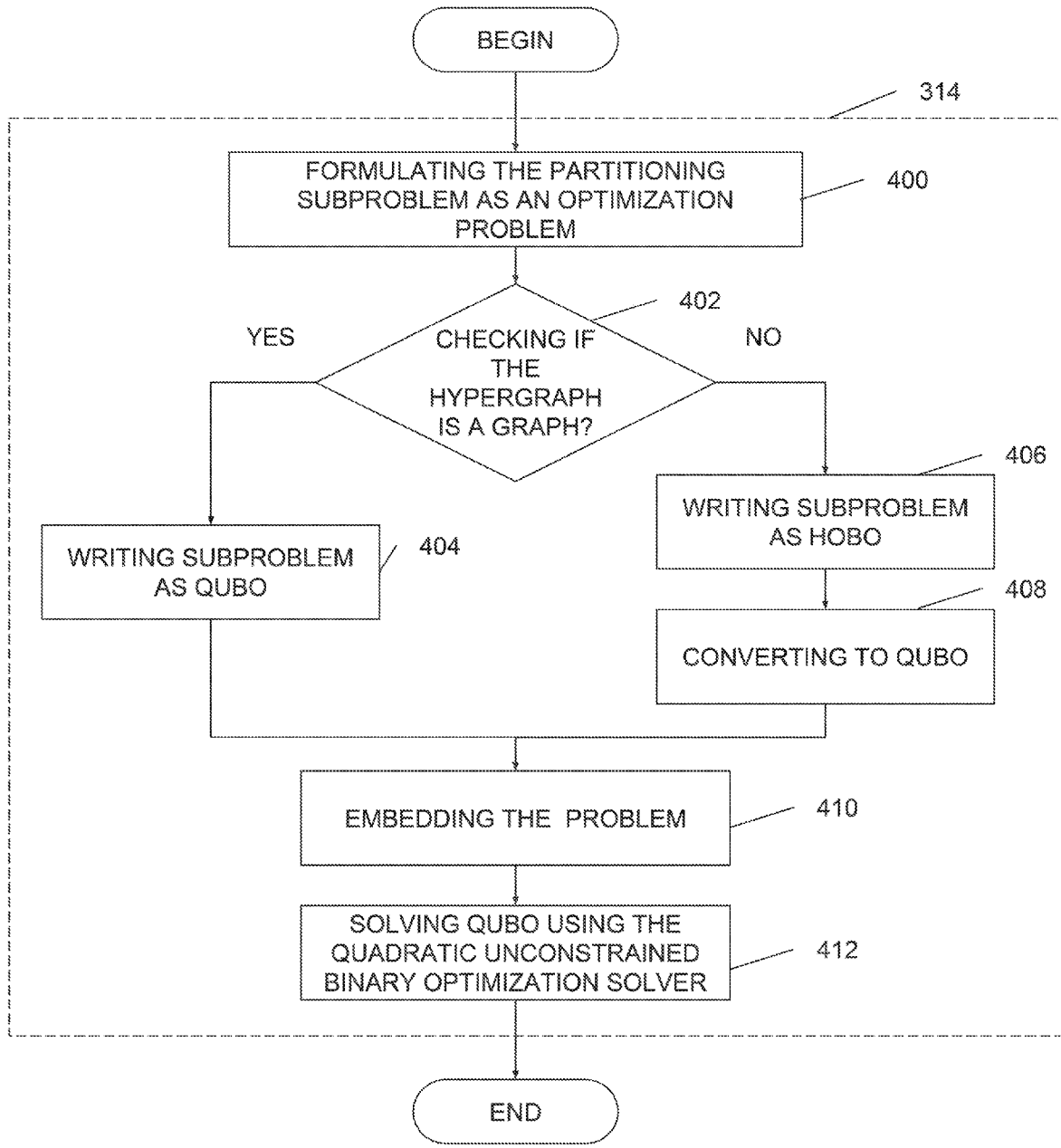
FIG. 4 is a flowchart which shows an embodiment of a method for solving a partitioning sub-problem using the quadratic unconstrained binary optimization solver.

Now referring to FIG. 4, there is shown an embodiment for partitioning a hypergraph on the quadratic unconstrained binary optimization solver.

According to processing step 400, the K-way partitioning of a hypergraph is formulated as an optimization problem where the objective function is constructed to represent the sum of the edge weights cut by the partitioning.

The optimization problem also specifies that partitions should be of similar size. It will be appreciated that further desired constraints may also need to be specified at this processing step.

According to processing steps 402-408, the optimization problem is then converted to a quadratic unconstrained binary optimization problem (QUBO) directly if the hypergraph is also a graph, or to a higher order unconstrained binary optimization problem (HOBO) first, and then to a quadratic unconstrained binary optimization problem if the hypergraph is not a graph.

It will be appreciated that, during this conversion, constraints are converted to penalty terms and added to the objective function to obtain an unconstrained formulation suitable for solving on the quadratic unconstrained binary optimization solver.

In one embodiment, the K-way partitioning of hypergraph G=(V, E) where |V|=N and E ⊂ P(V)†{Ø}, where P(V) is the power set of V and can be written as a higher-order binary polynomial optimization problem:

$$\max\left[\sum_{k=1}^{K}\sum_{e\in E}\prod_{j\in e}x_{jk} - A\sum_{k=1}^{K}\left(\sum_{j=1}^{N}x_{jk} - \frac{N}{K}\right)^2 - B\sum_{j=1}^{N}\left(\sum_{k=1}^{K}x_{jk} - 1\right)^2\right]$$

In this problem, $x_{jk}$ is a binary variable only equal to 1 if vertex j is assigned to be in partition k, otherwise it is 0.

According to processing step 410, the quadratic unconstrained binary optimization problem is embedded into the quadratic unconstrained binary optimization solver architecture. This step is also referred to as mapping the quadratic unconstrained binary optimization problem into the quadratic unconstrained binary optimization solver.

One embodiment for embedding the quadratic unconstrained binary optimization problem into the quadratic unconstrained binary optimization solver architecture is described in co-pending U.S. patent application entitled "Method and system for generating an embedding pattern used for solving a quadratic binary optimization problem" having Ser. No. 62/250,705, and which was filed on Nov. 4, 2015. It consists of finding a mapping between the problem's variables and the quadratic unconstrained binary optimization solver's registers. More specifically, a graph isomorphism between a graph representing the quadratic unconstrained binary optimization problem and a graph-minor of a graph representing the target graph is sought. It will be appreciated that various methods may be used.

In one embodiment, the quadratic unconstrained binary optimization solver is a D-Wave quantum annealer whose graph is referred to as a Chimera graph.

Figure 5:
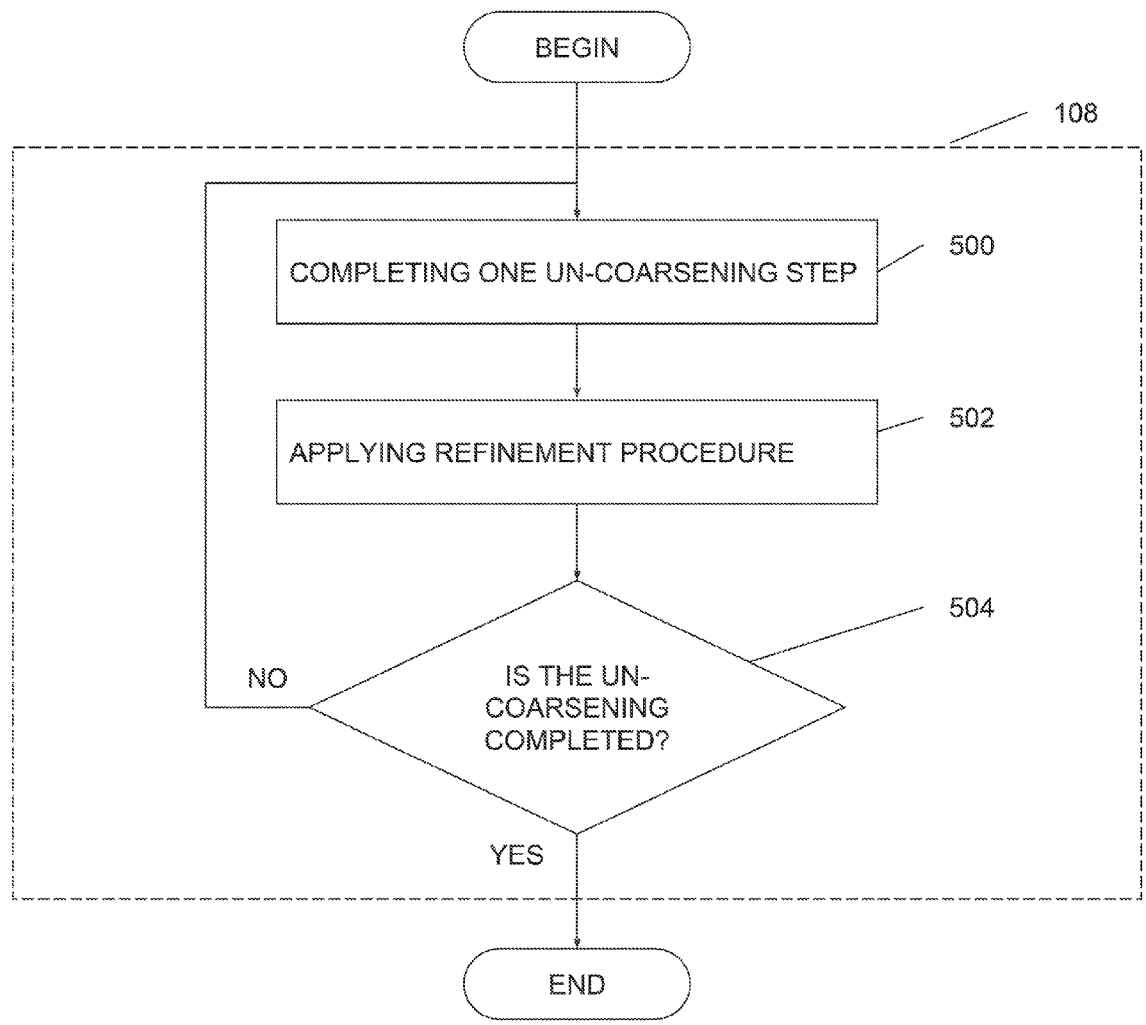
FIG. 5 is a flowchart which shows an embodiment of a method for un-coarsening a hypergraph iteratively.

Now referring to FIG. 5, there is shown an embodiment for performing the optional processing step 108 in more detail; the coarsest hypergraph and the partitioning is un-coarsened to obtain a partitioning of the original hypergraph.

It will be appreciated that the optional processing step 108 is performed by the digital computer in one embodiment.

In an alternative embodiment, the optional processing step 108 is performed by the digital computer using the quadratic unconstrained binary optimization solver.

According to processing step 500, one un-coarsening processing step is performed. The un-coarsening relies on the fact that the coarsening was done by building new effective vertices as collections of vertices of the previous hypergraph. Each new level contains references to the previous one allowing the coarsening process to be reverted while keeping track of the partitions created on the coarser hypergraph.

According to processing step 502, a refinement procedure is applied. During this processing step, small adjustments of the partitioning of the un-coarsened hypergraph are made. The partitioning, even if optimal for the coarse hypergraph, constitutes an approximation of the optimal partitioning of the un-coarsened hypergraph. It will be appreciated that the refinement procedure proposes the swap of vertices on either side of the partition division to further lower the sum of the edge weights cut by the partition. It will be further appreciated by the skilled addressee that various algorithms may be used.

In one embodiment, this refinement step can be assisted by the quadratic unconstrained binary optimization solver.

According to processing step 504, processing steps 500 and 502 are repeated until a partitioning of the original input hypergraph is achieved.

Figure 6:
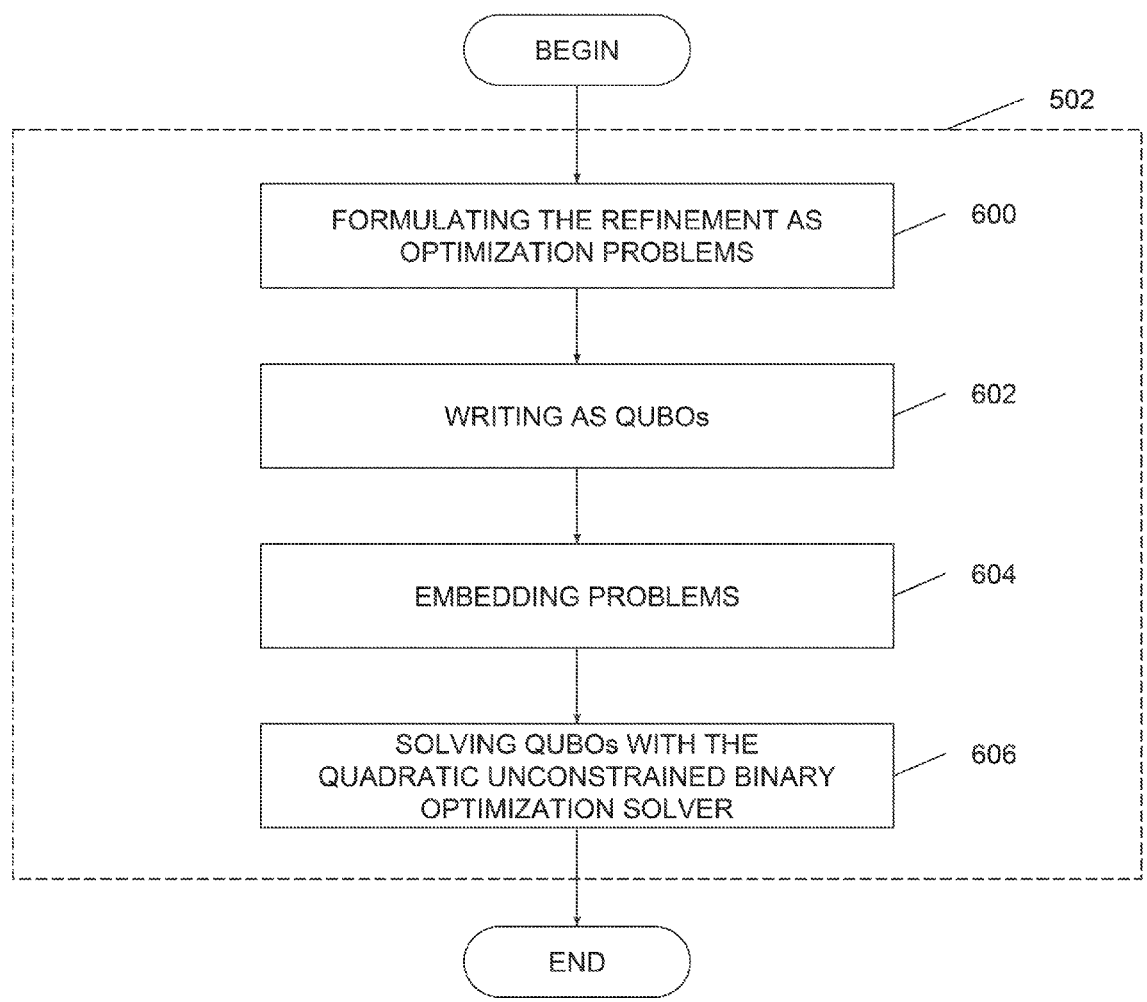
FIG. 6 is a flowchart which shows an embodiment of a method for un-coarsening a hypergraph iteratively using the quadratic unconstrained binary optimization solver.

Now referring to FIG. 6, an embodiment of a refinement processing step assisted by the quadratic unconstrained binary optimization solver is disclosed. While FIG. 6 presents this process as a single pass, it will be appreciated that in an alternative embodiment the process can be iterative.

According to processing step 600, an optimization for the refinement is generated. The refinement attempts to refine the partitioning by selecting the most likely candidates among the vertices to be swapped in order to further lower the sum of the cut edge weights while still respecting the constraints.

Still referring to FIG. 6 and according to processing step 602, constraints are converted to penalty terms and a quadratic unconstrained binary optimization problem is generated.

According to processing step 604, the quadratic unconstrained binary optimization problem is embedded into the quadratic unconstrained binary optimization solver and then solved by the quadratic unconstrained binary optimization solver in step 606.

Now referring back to FIG. 1 and according to processing step 110, an indication of the partitioning of the original hypergraph is provided to thereby solve the problem involving a hypergraph partitioning. It will be appreciated that the processing step comprises translating the at least one solution to provide an indication of the partitioning.

It will be appreciated that the indication of the partitioning of the original hypergraph may be provided according to various embodiments.

In one embodiment, the indication of the partitioning of the original hypergraph is provided by the digital computer to a user.

In another embodiment, the indication of the partitioning of the original hypergraph is provided by the digital computer to another computer operatively connected to the digital computer.

In another embodiment, the indication of the partitioning of the original hypergraph is provided to a software package.

In a further alternative embodiment, the indication of the partitioning of the original hypergraph is provided to an intelligent agent.

It will be appreciated that a non-transitory computer-readable storage medium is also disclosed for storing computer-executable instructions which, when executed, cause a digital computer to perform a method for solving a problem involving a hypergraph partitioning.

The method comprises receiving an indication of a problem involving a hypergraph partitioning, the indication comprising an indication of a hypergraph and metadata; obtaining an indication of at least one property associated with a quadratic unconstrained binary optimization solver operatively coupled with the digital computer; formulating a partitioning problem of the hypergraph as an unconstrained binary optimization problem; reducing the unconstrained binary optimization problem into a quadratic unconstrained binary optimization problem; mapping the quadratic unconstrained binary optimization problem into the quadratic unconstrained binary optimization solver; obtaining from the quadratic unconstrained binary optimization solver at least one solution to the quadratic unconstrained binary optimization problem; applying a refinement procedure and translating the refined at least one solution to provide an indication of the partitioning and providing the indication of the partitioning.

Figure 11:
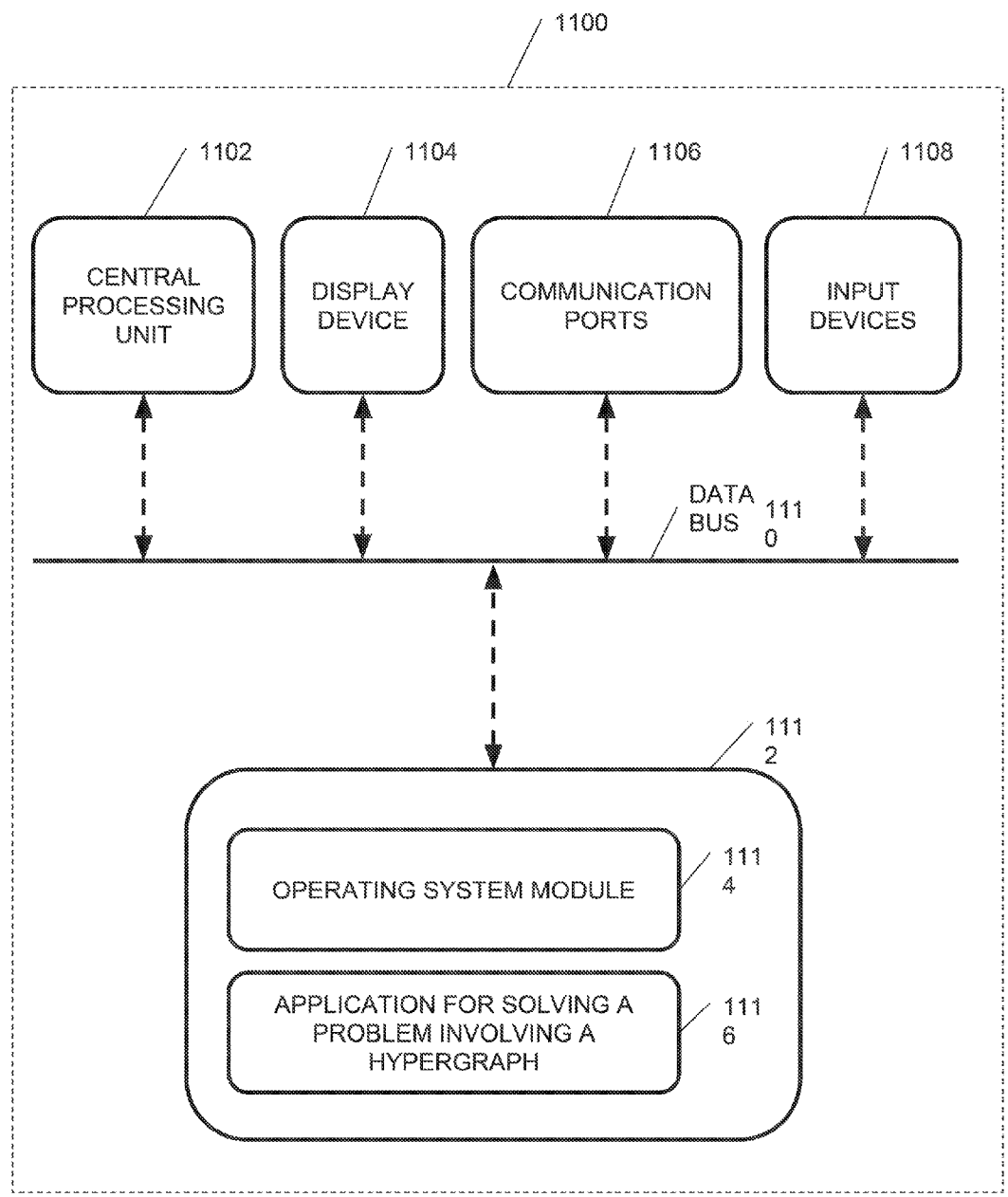
FIG. 11 is a diagram which illustrates an embodiment of a digital computer that may be operatively connected to the quadratic unconstrained binary optimization solver and that may be used for implementing a method for solving a problem involving a hypergraph partitioning.

Now referring to FIG. 11, there is disclosed an embodiment of a digital computer that may be operatively connected to the quadratic unconstrained binary optimization solver and that may be used for implementing a method for solving a problem involving a hypergraph partitioning.

The digital computer 1100 comprises a central processing unit 1102, a display device 1104, communication ports 1106, input devices 1108, a data bus 1110 and a memory unit 1112.

The central processing unit 1102, the display device 1104, the communication ports 1106, the input devices 1108 and the memory unit 1112 are interconnected using the data bus 1110.

The central processing unit 1102 is used for processing computer instructions. The skilled addressee will appreciate that various embodiments of the central processing unit 1102 may be provided.

In one embodiment, the central processing unit 1102 is a CPU Core i7 3820 running at 3.6 GHz and manufactured by Intel™.

The display device 1104 is used for displaying data to a user. The skilled addressee will appreciate that various types of display device 1104 may be used.

In one embodiment, the display device 1104 is a standard liquid-crystal display (LCD) monitor.

The communication ports 1106 are used for sharing data with the digital computer 1100.

The communication ports 1106 may comprise, for instance, a universal serial bus (USB) port for connecting a keyboard and a mouse to the digital computer 1100.

The communication ports 1106 may further comprise a data network communication port such as an IEEE 802.3 port for enabling a connection of the digital computer 1100 with another computer via a data network.

In fact, it will be appreciated that the communication ports 1106 may be used for operatively connecting the digital computer 1100 to the quadratic unconstrained binary optimization solver.

The skilled addressee will appreciate that various alternative embodiments of the communication ports 1106 may be provided.

In one embodiment, the communication ports 1106 comprise an Ethernet port and a mouse port (e.g., Logitech™).

The memory unit 1112 is used for storing computer-executable instructions.

It will be appreciated that the memory unit 1112 comprises, in one embodiment, an operating system module 1114.

It will be appreciated by the skilled addressee that the operating system module 1114 may be of various types.

In an embodiment, the operating system module 1114 is Windows™ 8 manufactured by Microsoft™.

The memory unit 1112 further comprises an application for solving a problem involving a hypergraph partitioning 1116.

The application for solving a problem involving a hypergraph partitioning 1116 comprises instructions for receiving an indication of a problem involving a hypergraph partitioning, the indication comprising an indication of a hypergraph and metadata.

The application for solving a problem involving a hypergraph partitioning 1116 further comprises instructions for obtaining an indication of at least one property associated with a quadratic unconstrained binary optimization solver operatively coupled with the digital computer.

The application for solving a problem involving a hypergraph partitioning 1116 further comprises instructions for formulating a partitioning problem of the hypergraph as an unconstrained binary optimization problem.

The application for solving a problem involving a hypergraph partitioning 1116 further comprises instructions for reducing the unconstrained binary optimization problem into a quadratic unconstrained binary optimization problem.

The application for solving a problem involving a hypergraph partitioning 1116 further comprises instructions for mapping the quadratic unconstrained binary optimization problem into the quadratic unconstrained binary optimization solver.

The application for solving a problem involving a hypergraph partitioning 1116 further comprises instructions for obtaining from the quadratic unconstrained binary optimization solver at least one solution to the quadratic unconstrained binary optimization problem.

The application for solving a problem involving a hypergraph partitioning 1116 further comprises instructions for applying a refinement procedure and translating the refined at least one solution to provide an indication of the partitioning.

The application for solving a problem involving a hypergraph partitioning 1116 further comprises instructions for providing the indication of the partitioning.

Applications

The skilled addressee will appreciate that the method for solving a problem involving a hypergraph partitioning may be used in various technological areas. For instance, problems in VLSI design, in load balancing for parallel computers, in network analysis, in optimal scheduling and in mesh partitioning for finite element methods, may involve hypergraph partitioning.

Solving graph partitioning in hypergraphs may also be important for many applications including, for instance, electronic design automation (EDA), efficient storage of large databases on disks and data mining.

Meshes used for describing the simulation domain of various physical simulations or calculations, such as computational fluid dynamics (CFD), are examples of hypergraphs. They are the product of the modelisation necessary for specifying the computation to be performed.

It will be appreciated that, in such applications, a hypergraph is composed of vertices representing geometric sections of the model under study, while the edges indicate the communication or information dependencies between them. Achieving optimal efficiency for a parallelized computation requires optimal load balancing which is an NP-hard problem. Load balancing on large parallel machines requires spreading the computational load evenly across all processors and minimizing the communication overhead. When the processes/tasks that perform the computation co-exist for the entire duration of the parallel program, the load balancing problem can be modeled as a constrained graph partitioning problem where the partitions are computing nodes.

An example of the benefits of a better partitioning is for instance a better quality load-balancing of CFD simulations on partitioned meshes. The parallel computation efficiency will be significantly improved as a result of a better quality load-balancing of CFD simulations on partitioned meshes (see L. Y. M. Gicquel, N. Gourdain, J.-F. Boussuge, H. Deniau, G. Staffelbach, P. Wolf, T. Poinsot, High performance parallel computing of flows in complex geometries, Comptes Rendus Mécanique, Volume 339, Issues 2-3, February-March 2011, pages 104-124, ISSN 1631-0721, http://dx.doi.org/10.1016/j.crme.2010.11.006).

In fact, in these applications and with prior art methods, not only the number of edges between the components is approximated, but also the sizes of the components.

As a matter of fact, it can be shown that no reasonable fully polynomial algorithms exist for these graphs.

The use of the method disclosed is therefore of great advantage for solving various technological problems.

Application of the Method Disclosed to Load Balancing in High Performance Computing Problem In this particular case, the technical problem to solve is to achieve load balancing in high performance computing. In this specific application, the problem is distributing the computation workload across multiple computing resources in order to:
1—minimize resource use;
2—maximize throughput (i.e. the rate of production or the processing rate);
3—minimize response time; and
4—avoid overloading resources (i.e. assigning tasks beyond a resource's capacity).

It will be appreciated that in order to benefit from parallelism, a computation workload must be divided into subtasks. A parallel computing platform includes a certain number of connected computing resources. Those computing resources are referred to as a computing node. These platforms benefit from running tasks on these nodes simultaneously.

In a general workload, the computation cost and duration of tasks are not necessarily uniform. It will be appreciated that some subtasks may also have dependencies. For example, a subtask might need to be completed before a second one can start. Because of these dependencies, computation subtasks may need to share data anytime during their computation, which is referred to as communication.

A majority of scientific computation problems, such as simulations related to finite element methods, requires an efficient use of parallel or distributed computation resources. The most efficient use of the parallel computation resources is achieved if there is a balanced assignment of subtasks to each computing node and if the communication between computing nodes is minimized.

It will be appreciated that a subtask division of a computation workload can be modeled as a weighted hypergraph. Each vertex represents one subtask and the weight of that vertex stands the computational cost of that load. There exists an edge between two vertices if data communication is needed between the corresponding computation subtasks.

Figure 8:
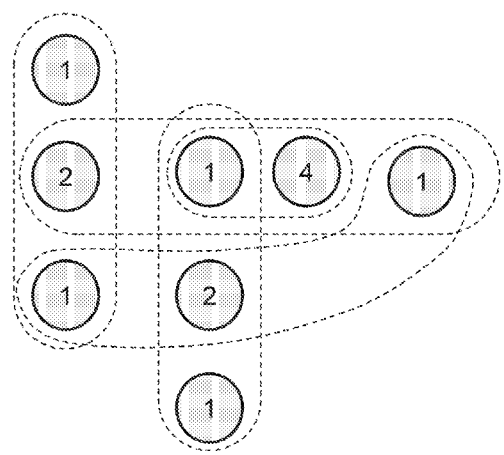
FIG. 8 is a diagram which illustrates an embodiment of a weighted hypergraph.
Figure 9:
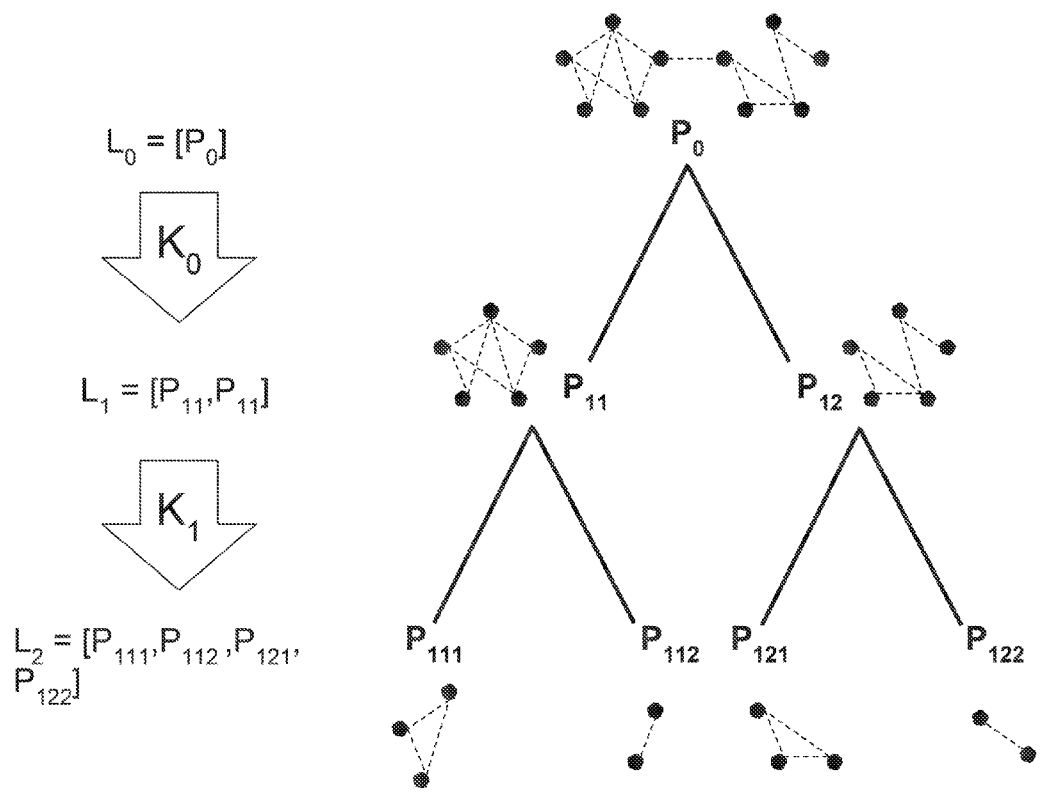
FIG. 9 is a diagram which illustrates an embodiment of an iterative graph partitioning using the method disclosed herein.

Now referring to FIG. 8, there is shown an embodiment of a hypergraph of subtasks. It will be appreciated that each subtask is a vertex embodiment and it is illustrated with a circle. The number inside the circle associates a weight to each subtask which corresponds to its computational cost. For instance, the dotted polygons represent an edge between a subset of the vertices.

If all the computing resources are available for the entire duration of the computation, the problem of finding the optimal assignment of subtasks to computing nodes can be modelled as a problem involving a hypergraph partitioning.

In such case, it will be appreciated that the hypergraph partitioning aims to assign a collection of tasks with almost equal computational cost to each computing node, while it minimizes the data communication between the computing nodes.

The skilled addressee will therefore appreciate that using optimal partitioning of subtask hypergraph may significantly improve the efficiency of the supercomputer, which is of great advantage.

A supercomputer with multiple computing nodes is an embodiment of a parallel computing platform. Each computing node consists of one or a plurality of central processing units (CPUs) and memory units, together referred to as computing resources.

It will be appreciated that the method disclosed herein can be implemented for various architectures of parallel and/or distributed computing platforms with any data communication architecture. For the sake of simplicity, all these variant embodiments are addressed with the word "supercomputer" in the following.

Figure 7:
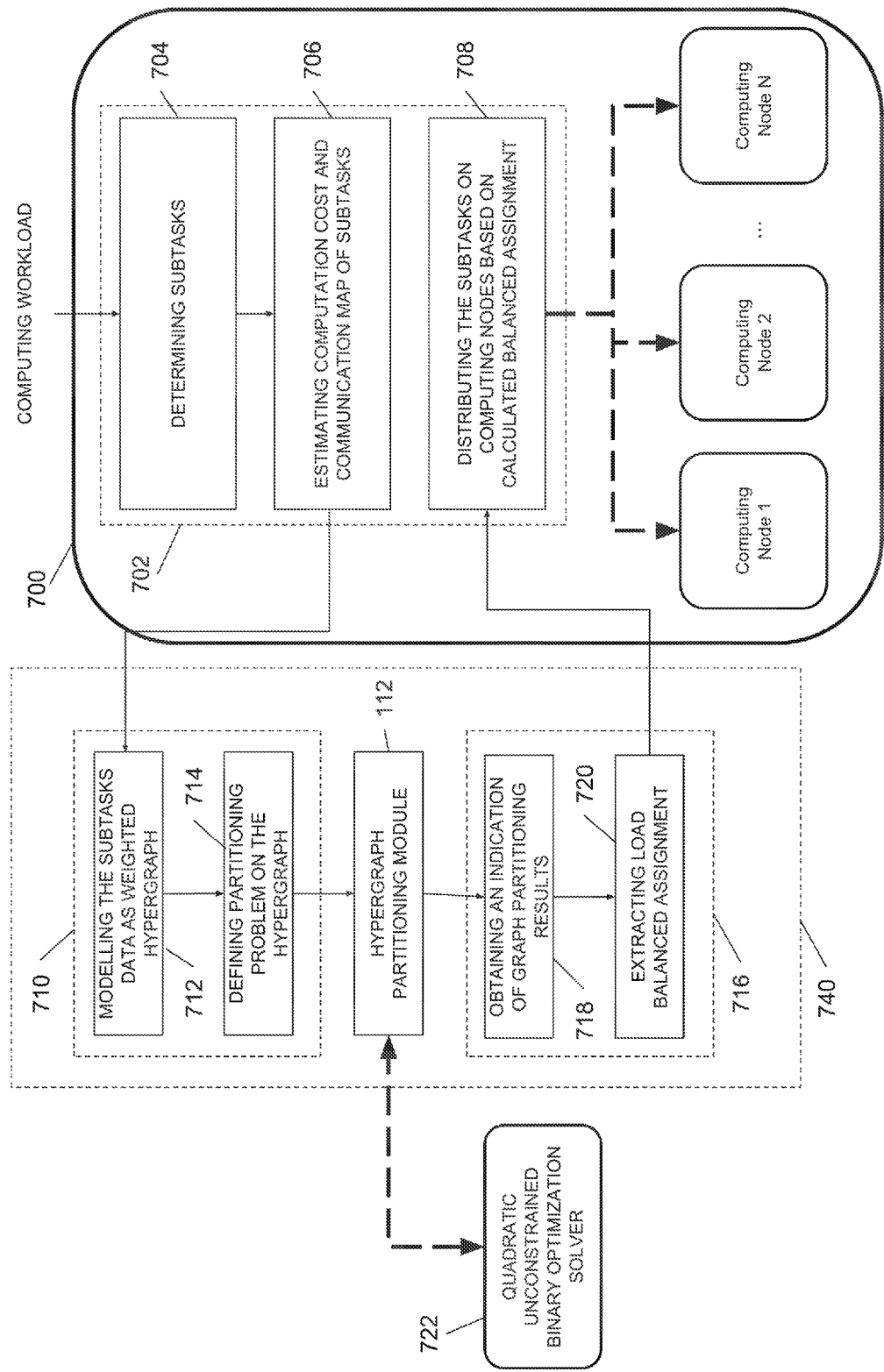
FIG. 7 is a flowchart which shows an embodiment of an application-specific architecture where the method disclosed herein may be used for assisting a supercomputer with load balancing.

Now referring to FIG. 7, there is shown an embodiment of an architecture in which the method disclosed herein may be used in order to enable a supercomputer to assign the subtasks to the computing nodes to thereby improve the efficiency of computation.

Element 700 illustrates an embodiment of a supercomputing platform. It will be appreciated that a load balancing unit 702 is illustrated in FIG. 7. Data communication lines to the N actual computing nodes of the supercomputer are illustrated with dashed arrows. It will be appreciated that the communication lines between the nodes are not illustrated for generality and simplicity.

When the supercomputer 700 receives a workload to compute, process 704 obtains the input workload to compute and divides the workload into meaningful subtasks. In one embodiment, the divided workload is provided to the supercomputer 700. In another embodiment, the process 704 recognizes the possible divisions of subtasks on its own by inspecting certain loops, repetitions, symmetries and possible decompositions of the input problem.

It will be appreciated that, in another embodiment, the problem of dividing the input workload into subtasks may be a partitioning problem by itself. Mesh partitioning in flow simulations is one such example, where dividing the problem into subtasks is reduced to partitioning the input mesh into non-overlapping pieces.

Process 706, estimates the computational cost of each subtask, as well as the communication map and data dependencies between the subtasks. At this stage, a process is required that obtains this information and decides which subtask is sent to which computing node. In the illustrated architecture, this is done by using the method disclosed herein as an external partitioning unit tasked with assisting the supercomputer 700 with this problem.

It will be appreciated that in one embodiment the external partitioning unit may be incorporated inside the supercomputer 700 as an auxiliary processing unit.

In an alternative embodiment, shown in FIG. 7, the partitioning unit 704 can be an external processing unit which communicates with the load balancing unit 702 in the supercomputer 700.

In an alternative embodiment, the graph partitioning method disclosed here uses the same computing nodes in the supercomputer 700 for solving the partitioning problem.

The subtasks with their corresponding estimated computational cost and information dependencies are provided to the partitioning algorithm.

It will be appreciated that processing step 710 can be referred to as a partitioning pre-processing. Inside this processing step, processing step 712 obtains the data about subtasks, their computational cost and dependencies, and models them as a hypergraph. It will be appreciated that the modeling may be performed according to various embodiments.

According to processing step 714, the hypergraph is obtained and the optimal assignment of the subtasks is modeled into computing nodes as a K-way hypergraph partitioning problem.

This hypergraph partitioning problem is then provided to a module for implementing the disclosed method for solving a problem involving a hypergraph partitioning 112. It will be appreciated that a quadratic unconstrained binary optimization solver 722 may be used.

It will be appreciated that in one embodiment the quadratic unconstrained binary optimization solver 722 is a quantum annealer developed by D-Wave Systems.

Figure 10:
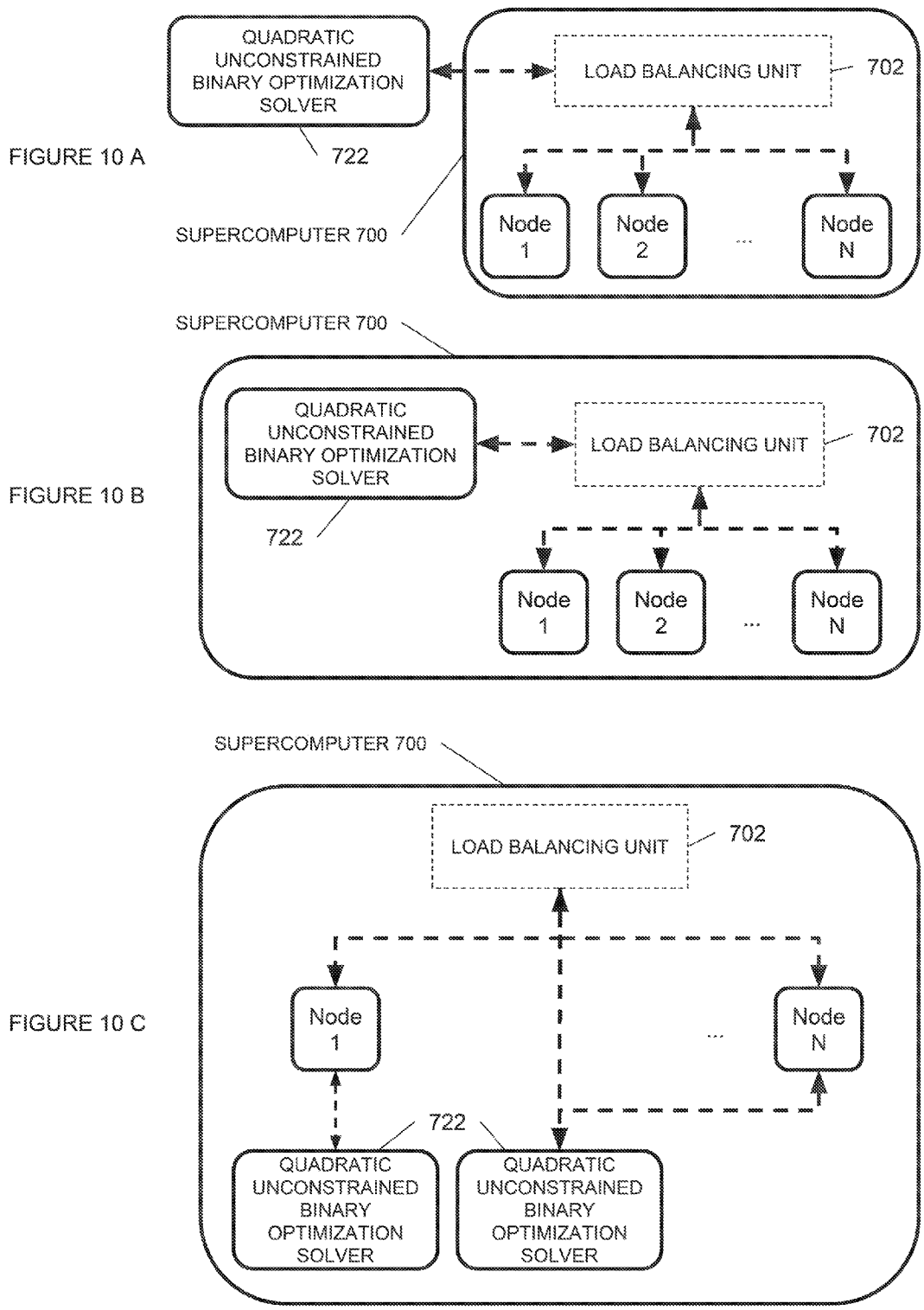
FIG. 10a is a diagram which shows an embodiment of supercomputer-quadratic unconstrained binary optimization solver hybrid architecture where the supercomputer sends queries to a separate external quadratic unconstrained binary optimization solver.
FIG. 10b is a diagram which shows an embodiment of supercomputer-quadratic unconstrained binary optimization solver hybrid architecture where the solver is a specialized computing node of the supercomputer architecture.
FIG. 10c is a diagram which shows an embodiment of supercomputer-quadratic unconstrained binary optimization solver hybrid architecture where at least one solver acts as a specialized computing node of the supercomputer and where regular and specialized nodes can communicate.

It will be appreciated that embodiments similar to that of FIG. 7 may be translated to an architecture where a quadratic unconstrained binary optimization solver is assisting a supercomputer 700 in achieving an improved efficiency. Alternative embodiments are illustrated in FIGS. 10A to 10C.

It will be appreciated that, once the module for implementing the disclosed method for solving a problem involving a hypergraph partitioning 112 solves the hypergraph partitioning, the results are provided to a post-processing unit 716.

In this post-processing unit 716, an indication of the results from the graph partitioner is obtained first in processing step 718. Then, in processing step 720 the indication of the results from the graph partitioner is translated into a valid assignment of the subtasks on the computing nodes of the supercomputer 700.

It will be appreciated that this translation is trivial according to the K-way partitioning problem definition. Each partition of the subtasks is assigned to a corresponding computing node in the supercomputer 700. The validity of this answer is checked using the available communication map of the computing nodes of the supercomputer 700.

Once an optimal assignment of the tasks is derived, the results are provided back to the load balancing unit 702 of the supercomputer 700.

At this stage, processing step 708 executes the instructions related to the distribution of tasks among the computation nodes and the initialization of the computation procedure. The supercomputer 700 then initiates the computation of the input workload.

It will be appreciated that, in an alternative embodiment, the pre- and post-processing units before and after the disclosed partitioning algorithm may be integrated into one processing unit responsible for the partitioning of the load balancing problem.

In another embodiment, all the partitioning processes may be integrated to a digital processing unit in the supercomputer 700 itself.

Now referring collectively to FIGS. 10A-10C, there are illustrated various alternative embodiments of the architecture in which the quadratic unconstrained binary optimization solver 722 can assist the supercomputer 700 to achieve higher efficiency in computation.

The boxes labeled as nodes represent computing nodes of the supercomputer 700. The quadratic unconstrained binary optimization solver 722 includes all classical pre- and post-processing procedures needed to access and utilize this device. In one embodiment, these processes include what is illustrated in FIG. 7 as pre- and post-processing units, as well as the processes in FIG. 4 before and after accessing the quadratic unconstrained binary optimization solver.

FIG. 10A shows an embodiment similar to that of FIG. 7 where the quadratic binary optimization solver and the required pre- and post-processing steps are assumed to be an external computing resource for the supercomputer 700.

FIG. 10B shows an embodiment where the quadratic unconstrained binary optimization solver and the required pre- and post-processes are assumed as an internal yet auxiliary resource to the supercomputer 700.

FIG. 10C shows a more general architecture where the quadratic unconstrained binary optimization solver 722 is considered as one of the computing nodes. The load balancing unit 702 offloads the relevant problems to the quadratic unconstrained binary optimization solver 722. The quadratic unconstrained binary optimization solver 722 can also communicate with other classical nodes. In this way, other computing nodes can offload certain partitioning problems to the quadratic unconstrained binary optimization solver 722 as well.

It is appreciated that in an alternative embodiment, the quadratic unconstrained binary optimization solver 722 can be a cloud-based service for both the load balancing unit 702 and the computing nodes in the supercomputer 700.

The invention claimed is:

1. A method for solving a load balancing problem involving a hypergraph partitioning, the method comprising:
    receiving in a digital computer an indication of a load balancing problem involving a hypergraph partitioning, the load balancing problem involving an allocation of an input workload, in the form of two or more subtasks, to two or more computing nodes of a computer, the indication comprising an indication of a hypergraph and metadata, the hypergraph and metadata comprises the two or more subtasks with corresponding estimated computational cost and information dependencies;
    obtaining in the digital computer an indication of at least one property associated with a quadratic unconstrained binary optimization solver operatively coupled with the digital computer;
    using the digital computer, formulating a partitioning problem of the hypergraph as a quadratic unconstrained binary optimization problem, wherein the partitioning problem comprises an optimal assignment of the two or more subtasks modeled into the two or more computing nodes as a K-way hypergraph partitioning problem;
    mapping the quadratic unconstrained binary optimization problem into the quadratic unconstrained binary optimization solver;
    obtaining in the digital computer from the quadratic unconstrained binary optimization solver at least one solution to the quadratic unconstrained binary optimization problem;
    using the digital computer, translating the at least one solution to provide an indication of the partitioning, the indication of the partitioning comprises a valid assignment of the two or more subtasks on the two or more computing nodes; and
    providing the indication of the partitioning using the digital computer and causing the digital computer to distribute the two or more subtasks among the two or more computation nodes and initialize a computation procedure comprising the two or more subtasks.

2. The method as claimed in claim 1, further comprising performing a pre-processing of the hypergraph using the digital computer to provide a new hypergraph having a suitable size for the quadratic unconstrained binary optimization solver; wherein the formulating of the partitioning problem as a quadratic unconstrained binary optimization problem is performed using the new hypergraph; further comprising performing a post-processing of the at least one solution using the digital computer to provide post-processed at least one solution, further wherein the translating to provide an indication of the partitioning is performed using the post-processed at least one solution.

3. The method as claimed in claim 2, wherein the pre-processing of the hypergraph to provide a new hypergraph having a suitable size for the quadratic unconstrained binary optimization solver comprises performing a coarsening of the hypergraph; further wherein the post-processing of the at least one solution comprises performing an un-coarsening of the at least one solution.

4. The method as claimed in claim 1, wherein the indication of a load balancing problem involving a hypergraph partitioning is received from at least one of a user interacting with the digital computer, a computer operatively connected to the digital computer, a software package and an intelligent agent.

5. The method as claimed in claim 1, wherein the indication of at least one property associated with a quadratic unconstrained binary optimization solver operatively coupled with the digital computer is obtained from at least one of a user interacting with the digital computer, a computer operatively connected to the digital computer, a software package, the quadratic unconstrained binary optimization solver and an intelligent agent.

6. The method as claimed in claim 3, wherein the coarsening of the hypergraph comprises:
determining a coarsening objective; and
performing a coarsening of the hypergraph.

7. The method as claimed in claim 6, further comprising:
determining if at least one further coarsening can be performed;
determining if the coarsening objective is met; and
performing at last one further coarsening if the coarsening objective is not met and if the at least one further coarsening can be performed.

8. The method as claimed in claim 1, wherein the formulating of a partitioning problem of the new hypergraph as a quadratic unconstrained binary optimization problem comprises formulating a plurality of partitioning problems, each of the plurality of partitioning problems as a corresponding quadratic unconstrained binary optimization problem; further wherein each of the plurality of corresponding quadratic unconstrained binary optimization problems is mapped into the quadratic unconstrained binary optimization solver and further wherein a plurality of at least one solution is obtained in the digital computer from the quadratic unconstrained binary optimization solver for each of the corresponding plurality of partitioning problems.

9. The method as claimed in claim 1, wherein the formulating of a partitioning problem of the new hypergraph as a quadratic unconstrained binary optimization problem comprises:
determining if the new hypergraph is a graph; and
if the new hypergraph is not a graph:
formulating, using the digital computer, the partitioning problem of the new hypergraph as an unconstrained binary optimization problem; and
reducing the unconstrained binary optimization problem into a quadratic unconstrained binary optimization problem.

10. The method as claimed in claim 3, wherein the un-coarsening of the at least one solution comprises:
until un-coarsening is completed:
performing an un-coarsening of the at least one solution; and
applying a refinement procedure on the least one un-coarsened solution.

11. The method as claimed in claim 10, wherein the refinement procedure on the at least one un-coarsened solution comprises:
formulating refinement as at least one optimization problem;
converting constraints to penalty terms and generating a corresponding quadratic unconstrained binary optimization problem using the at least one optimization problem;
embedding the corresponding quadratic unconstrained binary optimization problem into the quadratic unconstrained binary optimization solver; and
obtaining from the quadratic unconstrained binary optimization solver a solution to the corresponding quadratic unconstrained binary optimization problem.

12. A method for solving a load balancing problem involving a hypergraph partitioning, the method comprising:
receiving an indication of a load balancing problem involving a hypergraph partitioning, the load balancing problem involving an allocation of an input workload, in the form of two or more subtasks, to two or more computing nodes of a computer, the indication comprising an indication of a hypergraph and metadata, the hypergraph and metadata comprising the two or more subtasks with corresponding estimated computational cost and information dependencies;
obtaining an indication of at least one property associated with a quadratic unconstrained binary optimization solver operatively coupled with the digital computer;
formulating a partitioning problem of the hypergraph as an unconstrained binary optimization problem, wherein the partitioning problem comprises an optimal assignment of the two or more subtasks modeled into the two or more computing nodes as a K-way hypergraph partitioning problem;
reducing the unconstrained binary optimization problem into a quadratic unconstrained binary optimization problem;
mapping the quadratic unconstrained binary optimization problem into the quadratic unconstrained binary optimization solver;
obtaining from the quadratic unconstrained binary optimization solver at least one solution to the quadratic unconstrained binary optimization problem;
applying a refinement procedure and translating the refined at least one solution to provide an indication of the partitioning, the indication of the partitioning comprising a valid assignment of the two or more subtasks on the two or more computing nodes;
providing the indication of the partitioning.

13. The method as claimed in claim 12, further comprising performing a coarsening of the hypergraph to provide a new hypergraph having a suitable size for the quadratic unconstrained binary optimization solver; wherein the formulating of the partitioning problem as an unconstrained binary optimization problem is performed using the new hypergraph; further comprising performing an un-coarsening of the at least one solution; further wherein the applying of the refinement procedure is performed on the un-coarsened at least one solution and the translating to provide an indication of the partitioning is performed on the refined un-coarsened at least one solution.

14. The method as claimed in claim 1, wherein the indication of the partitioning is provided to at least one of a user interacting with the digital computer, a computer operatively connected to the digital computer, a software package and an intelligent agent.

15. A system for solving a load balancing problem involving a hypergraph partitioning, the system comprising:
a digital computer for receiving an indication of a load balancing problem involving a hypergraph partitioning, the load balancing problem involving an allocation of an input workload, in the form of two or more subtasks, to two or more computing nodes of a computer, the indication comprising an indication of a hypergraph and metadata, the hypergraph and metadata comprising the two or more subtasks with corresponding estimated computational cost and information dependencies; the digital computer for performing a coarsening of the hypergraph to provide a new hypergraph having a suitable size for the quadratic unconstrained binary optimization solver; the digital computer for formulating a partitioning problem of the new hypergraph as an unconstrained binary optimization problem, wherein the partitioning problem comprises an optimal assignment of the two or more subtasks modeled into the two or more computing nodes as a K-way hypergraph partitioning problem and for reducing the unconstrained binary optimization problem into a quadratic unconstrained binary optimization problem; the digital computer for providing the quadratic unconstrained binary optimization problem; and
a quadratic unconstrained binary optimization solver operatively coupled to the digital computer, the quadratic unconstrained binary optimization solver for receiving the quadratic unconstrained binary optimization problem from the digital computer and for determining at least one solution to the quadratic unconstrained binary optimization problem; and
wherein the digital computer further performs an un-coarsening of the at least one solution, applies a refinement procedure and translates the refined un-coarsened at least one solution to provide an indication of the partitioning, the indication of the partitioning comprising a valid assignment of the two or more subtasks on the two or more computing nodes.

16. A digital computer comprising:
a central processing unit;
a display device;
a communication port for operatively connecting the digital computer to a quadratic unconstrained binary optimization solver;
a memory unit comprising an application for solving a load balancing problem involving a hypergraph partitioning, the application comprising:
instructions for receiving an indication of a load balancing problem involving a hypergraph partitioning, the load balancing problem involving an allocation of an input workload, in the form of two or more subtasks, to two or more computing nodes of a computer, the indication comprising an indication of a hypergraph and metadata, the hypergraph and metadata comprising the two or more subtasks with corresponding estimated computational cost and information dependencies;
instructions for obtaining an indication of at least one property associated with the quadratic unconstrained binary optimization solver operatively coupled with the digital computer;
instructions for formulating a partitioning problem of the hypergraph as an unconstrained binary optimization problem, wherein the partitioning problem comprises an optimal assignment of the two or more subtasks modeled into the two or more computing nodes as a K-way hypergraph partitioning problem;
instructions for reducing the unconstrained binary optimization problem into a quadratic unconstrained binary optimization problem;
instructions for mapping the quadratic unconstrained binary optimization problem into the quadratic unconstrained binary optimization solver;
instructions for obtaining from the quadratic unconstrained binary optimization solver at least one solution to the quadratic unconstrained binary optimization problem;
instructions for applying a refinement procedure and translating the refined at least one solution to provide an indication of the partitioning, the indication of the partitioning comprising a valid assignment of the two or more subtasks on the two or more computing nodes; and
instructions for providing the indication of the partitioning.

17. A non-transitory computer-readable storage medium for storing computer-executable instructions which, when executed, cause a digital computer to perform a method for solving a load balancing problem involving a hypergraph partitioning, the method comprising receiving an indication of a load balancing problem involving a hypergraph partitioning, the load balancing problem involving an allocation of an input workload, in the form of two or more subtasks, to two or more computing nodes of a computer, the indication comprising an indication of a hypergraph and metadata, the hypergraph and metadata comprising the two or more subtasks with corresponding estimated computational cost and information dependencies; obtaining an indication of at least one property associated with a quadratic unconstrained binary optimization solver operatively coupled with the digital computer; formulating a partitioning problem of the hypergraph as an unconstrained binary optimization problem; reducing the unconstrained binary optimization problem into a quadratic unconstrained binary optimization problem, wherein the partitioning problem comprises an optimal assignment of the two or more subtasks modeled into the two or more computing nodes as a K-way hypergraph partitioning problem; mapping the quadratic unconstrained binary optimization problem into the quadratic unconstrained binary optimization solver; obtaining from the quadratic unconstrained binary optimization solver at least one solution to the quadratic unconstrained binary optimization problem; applying a refinement procedure and translating the refined at least one solution to provide an indication of the partitioning, the indication of the partitioning comprising a valid assignment of the two or more subtasks on the two or more computing nodes and providing the indication of the partitioning.

* * * * *